(12) United States Patent
Chou (10) Patent No.: US 7,527,374 B2
(45) Date of Patent: May 5, 2009

(54) SLIM FRAME OF SPECTACLE HAVING ELECTRONIC DEVICE THEREON, AND SPECTACLE HAVING THE SAME

(76) Inventor: Chia-Lin Chou, 4-5 Fl., No. 461, Section 5, Chung-Hsiao East Road, Taipei (TW)

( * ) Notice: Subject to any disclaimer, the term of this patent is extended or adjusted under 35 U.S.C. 154(b) by 138 days.

(21) Appl. No.: 11/827,148

(22) Filed: Jul. 10, 2007

(65) Prior Publication Data
US 2008/0013041 A1    Jan. 17, 2008

(30) Foreign Application Priority Data
Jul. 12, 2006    (TW) .............................. 95125469 A (51) Int. Cl.
*G02C 1/00* (2006.01)
(52) U.S. Cl. ....................... 351/158; 351/154
(58) Field of Classification Search .................. 351/41, 351/83–86, 154, 158
See application file for complete search history.

(56) References Cited

U.S. PATENT DOCUMENTS 5,606,743 A * 2/1997 Vogt et al. .................. 455/347

2006/0012974 A1 * 1/2006 Su .............................. 362/105
2007/0201000 A1 * 8/2007 Jackson et al. .............. 351/158

FOREIGN PATENT DOCUMENTS

TW    M 287442    2/2006

* cited by examiner

*Primary Examiner*—Huy K Mai
(74) *Attorney, Agent, or Firm*—Bucknam and Archer

(57) ABSTRACT

A frame of spectacle having electronic device thereon, comprising: a pair of eyewires, along the inside of each eyewire is formed with an engaging section for engaging with a glass, and a bridge section is interlinked between the pair of eyewires; a pair of temples pivotally mounted at both sides of the eyewires by hinges; a circuit board provided on one of the temples, which has an electronic circuit for receiving and/or playing audio signals; a power supply device provided on the other temple, which supplies power to the circuit board through a lead wire; and a pair of earphones for outputting audio signal, wherein a wire groove for receiving the lead wires is integrally formed on the upper end portion of the pair of eyewires along the upper part of the engaging sections of the glasses, and the wire groove penetrates through the bridge section and the hinges. In this way, the frame of spectacle can be made slim and lightweight.

22 Claims, 7 Drawing Sheets

SLIM FRAME OF SPECTACLE HAVING ELECTRONIC DEVICE THEREON, AND SPECTACLE HAVING THE SAME

BACKGROUND OF THE INVENTION

1. Field of the Invention

The present invention relates to a frame of spectacle having an electronic device thereon, and more particularly to a slim frame of spectacle having an electronic device, in which the lead wire from the circuit is designed to route right above the top side the lens, thus effectively utilizing the whole cross sectional area of the eyewires to minimize the size thereof.

2. Brief Description of the Prior Art

Figure 1:
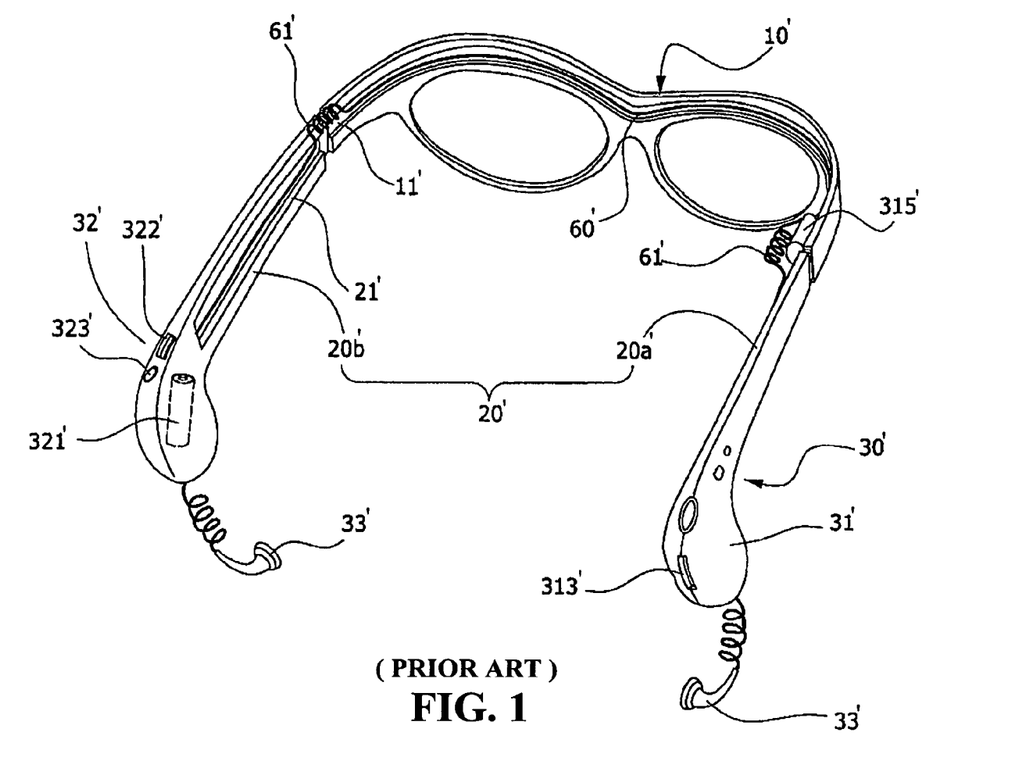
FIG. 1 is a schematic view showing a prior art of Taiwanese Patent No. M287442 entitled as "Spectacle Structure Having Music Player"

The electronic spectacles currently sold in the market looks new to the customer as a result of the combination of electronic parts with the conventional spectacle. However, the frame is apt to be oversized and over-weighted due to its nature in structure, thus greatly degrading the aesthetic sense and utility. Due to the size concern, the conventional electronic spectacle is only applicable to outdoor sports sunglasses. As shown in FIG. 1, a Taiwanese Patent No. 287442 entitled "A Spectacle Having Music Player" is mainly formed by an eyewire (10') and two temples (20'), in which a music player (30') is provided on the temples (20'). The music player (30') contains a main system section (31') disposed on one temple (20') and having a main chip and a flash memory chip, a battery section (32'), a switch (322') and a power input plug hole (323') provided on the other temple (20') a earphone (33') is provided respectively on the main system section (31') and the battery section (32').

Figure 1A:
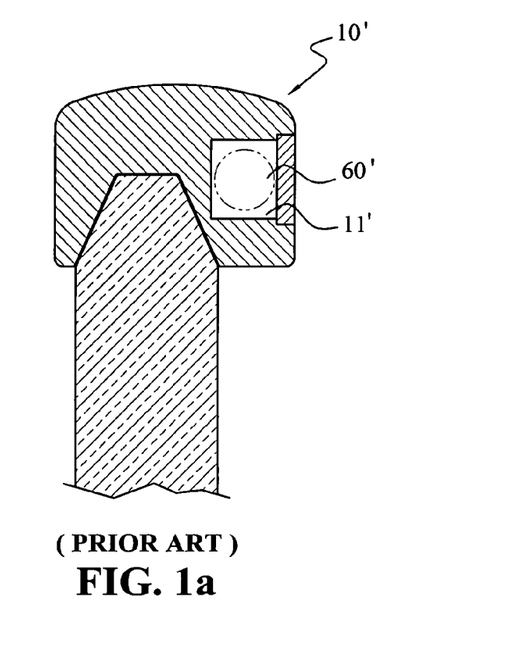
FIG. 1*a* is a partially enlarged cross-sectional view showing the conventional frame of spectacle in FIG. 1.

Despite the fact that the above-mentioned publication can achieve the goal of listening music through the music player provided on the frame of the spectacle, to the extent that one ordinarily skilled in the related art understands, the cross-sectional structure of the eyewire of the publication (including the electronic spectacle at present), as shown in FIG. 1*a*, has a recessed groove (11') formed along the rear upper side of the eyewire (10') for accommodating a lead wire (60'), and a cap provided on the surface of the recessed groove (11'). Due to the nature in structure, the eyewire (10') inevitably becomes thick and heavy. This will not only induce negative aesthetic sense but also greatly restrict its field of application. Therefore, all these lead to lower utility, unsatisfactory operation and room for improvement.

SUMMARY OF THE INVENTION

Aiming at improving the defects of prior art, the main object of this invention is to provide a slim frame of spectacle having electronic device thereon, in which the lead wire of circuit is designed to extend immediately above the glasses, thus the whole cross sectional area of the eyewire is effectively utilized so as to minimize the size of the frame.

In order to achieve the above and the other objects, a frame of spectacle having electronic device thereon of this invention comprises: a pair of eyewires, formed with an engaging section along the inside of each eyewire for engaging with a glass, and a bridge section interlinked between the pair of eyewires; a pair of temples pivotally mounted at both sides of the eyewires by hinges; a circuit board provided on one of the temples, which has an electronic circuit for receiving and playing audio signals a power supply device provided on the other temple, which supplies power to the circuit board through a lead wire; and a pair of earphones for outputting the audio signals, wherein:

a wire groove for receiving the lead wires is integrally formed on the upper end portion of the pair of eyewires along the upper part of the engaging sections of the glasses, and the wire groove penetrating through the bridge section and the hinges, said lead wire being used to electrically connect the circuit board and the power supply device through the wire groove.

According to the present invention, in the cross section of the eyewires, the wire groove and the engaging section for glass are centered on a centerline and connected together to form an opened groove facing downward. The lead wire extends immediately above the glasses so that the whole cross sectional area of the eyewires can be effectively utilized so as to minimize the size of the frame.

According to the present invention, the wire groove penetrates through the cross section of the bridge section. In the cross section of the hinge portion, the wire groove penetrates through the hinge portion at a location deflected from the through hole for shaft pin in a direction perpendicular to the through hole in such a manner that optimum arrangement among the shaft pin, the wire groove and the wall thickness in the hinge portion provides excellent downsizing for the frame.

Usually, the components having largest thickness mounted on the circuit board are charge socket and earphone socket. The circuit board according to this invention is provided on its printed wiring board with two cut-out portions having the same outside dimensions as the charge socket and the earphone socket, and the charge socket and the earphone socket are inserted respectively into the cut-out portion such that the thickness of the charge socket and the thickness of the earphone socket are equally distributed on both sides of the circuit board. In this manner, the thickness of the charge socket or the thickness of the earphone socket and thus the thickness of the circuit board is totally accommodated within the range of the temple thickness without additional partial enlargement on the temples. Accordingly, the effect of significant saving on weight and space can be obtained. Besides, the size required for earphone application can be reduced. Therefore, the effect of whole aesthetic coordination as well as the weight reduction can be achieved.

According to the present invention, the sliminess and the light-weight of the whole spectacle makes it applicable not only as sun glass for outdoor sport use but also as near-sighted glass, reading glass for old people, hearing-aid like ordinary spectacle for long term use in outdoor as well as indoor activity.

BRIEF DESCRIPTION OF THE DRAWINGS

FIG. 2g is an enlarged schematic view of the encircled portion showing a detached state in FIG. 2a.

FIG. 3i is an enlarged schematic view of the encircled portion, in a detached state, in FIG. 3a.

DETAILED DESCRIPTION OF THE PREFERRED EMBODIMENTS

The technical features of the present invention will become more comprehensive by referring to the detailed description of following embodiments, which are merely illustrative rather than restrictive on the scope of the present invention, in conjunction with the attached drawings.

Figure 2A:
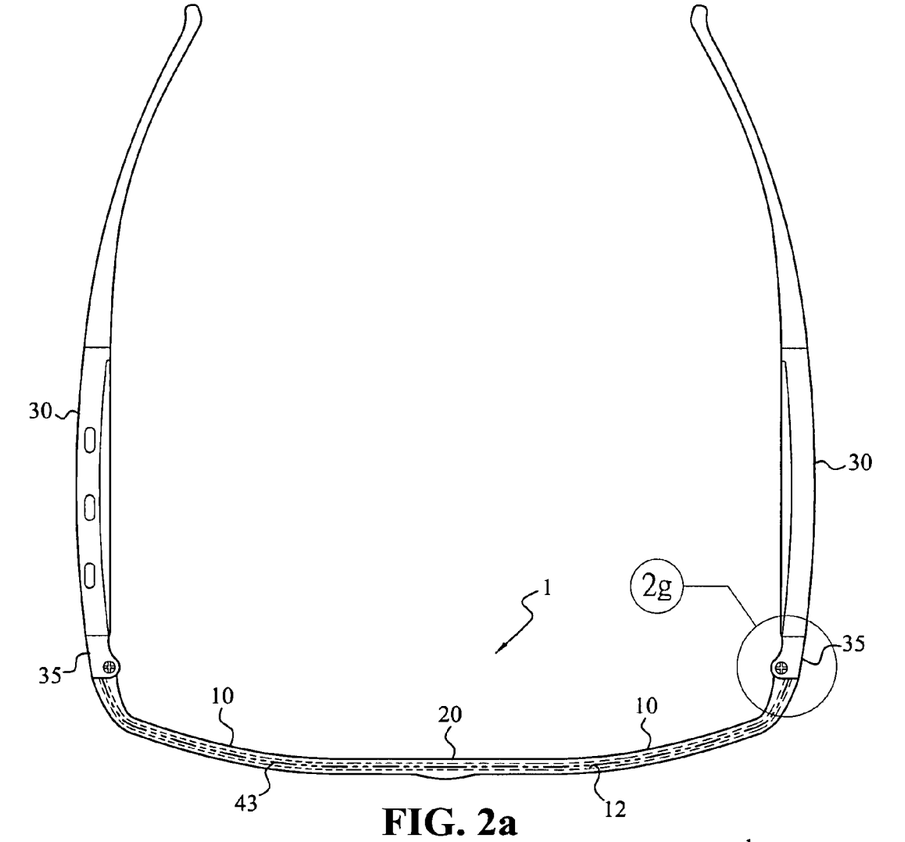
FIG. 2*a* is a schematic plane view showing the first embodiment of the frame of spectacle of the present invention.
Figure 2B:
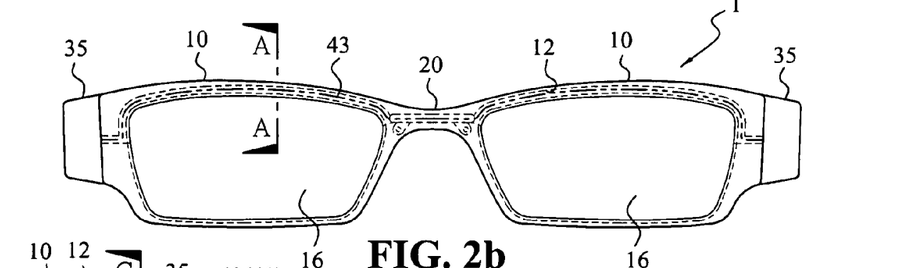
FIG. 2*b* is a schematic front view showing the first embodiment of the frame of spectacle of the present invention.
Figure 2C:
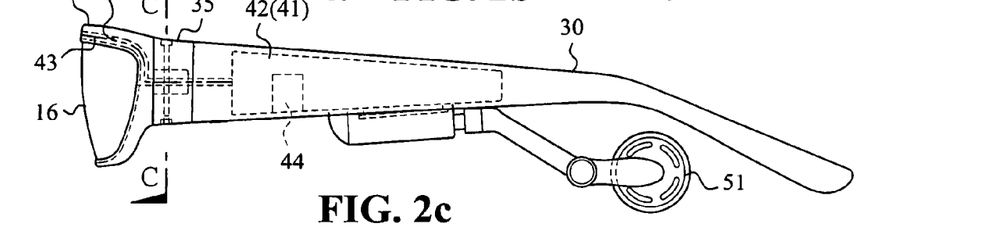
FIG. 2*c* is a schematic side view showing the first embodiment of the frame of spectacle of the present invention.
Figure 2D:
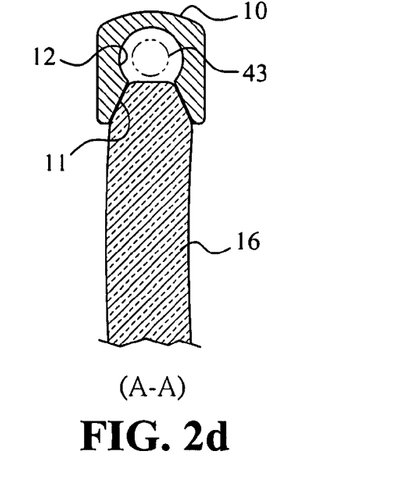
FIG. 2*d* is a enlarged schematic cross-sectional view taken along the A-A direction of FIG. 2*b*.

Firstly, please refer to FIGS. 2a~2h, which show the first embodiment of the slim frame 1 of spectacle having electronic device thereon of the present invention. The frame of the embodiment is formed by bundling plastic material, such as polycarbonate (PC), TR90, ABS (acrylonitrile-butadiene-styrene), PP (polypropylene), and polyamide etc., with metal sheet material such as aluminum sheet, titanium sheet. As shown in FIGS. 2a, 2b and 2c, the frame 1 mainly comprises: a pair of eyewires 10 formed with an engaging section 11 along the inner side of each eyewire 10 for engaging with a lens 16, and a bridge section 20 between the two eyewires 10; a pair of temples 30 pivotally mounted at both sides of the eyewires by hinges 35; a circuit board 41 provided on one of the temples 30, which has a media receiving and playing circuit for receiving and/or playing audio signals such as radio broadcasting signals or MP3; a power supply device 42, e.g. a rechargeable battery, provided on the other temple 30 for supplying power to the circuit board 41 through a lead wire 43; and a pair of earphones 51 combined on the two temples 30 for listening to the electronic signals outputted from the electronic circuit, in which a wire groove 12 for receiving the lead wires 43, as shown in FIG. 2d, is integrally formed on the upper side of the two eyewires 10 and along the upper part of the engaging sections 11. The lead wire 43 closely route along the top side of the glasses 16 so that the whole cross sectional area of the eyewire 10 is effectively utilized to minimize the total size of the frame of spectacle 10. The wire groove 12 penetrates through the bridge section 20 and the hinges 35. With this structure, the lead wire 43 is electrically connected from the circuit board 41 to the power supply device 42.

Figure 2E:
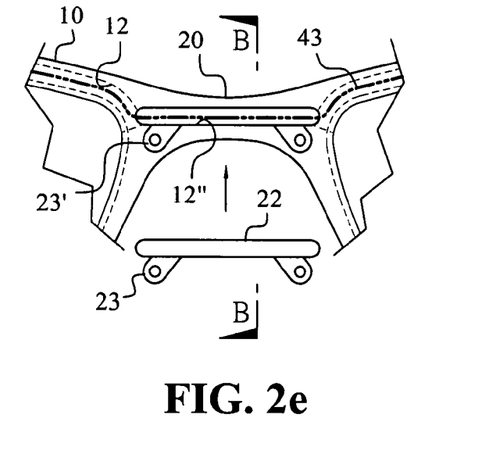
FIG. 2*e* is a partially enlarged view showing the bridge section in detached state of the first embodiment of the frame of spectacle of the present invention.
Figure 2F:
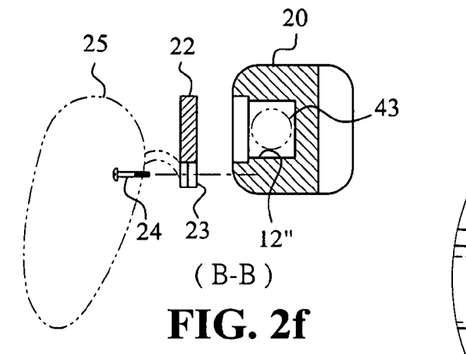
FIG. 2f is a schematic cross-sectional view taken along the B-B direction of FIG. 2e and showing a detached state.

Next, as shown in FIGS. 2e and 2f, the wire groove 12 is formed with a rectangular groove 12" throughout the rear face of the bridge section 20. A pair of recessed portions 23' are provided near both ends of the groove 12". A cover plate 22 having shape matching that of the groove 12" is formed, at both sides, with a pair of lugs 23 conforming to the recessed portions 23'. The cover plate 22 can be fixed above the groove 12" by suitable fastening means such as bolts 24. At the same time, the lugs 23 can be used to fix a pair of nose pads 25.

Figure 2G:
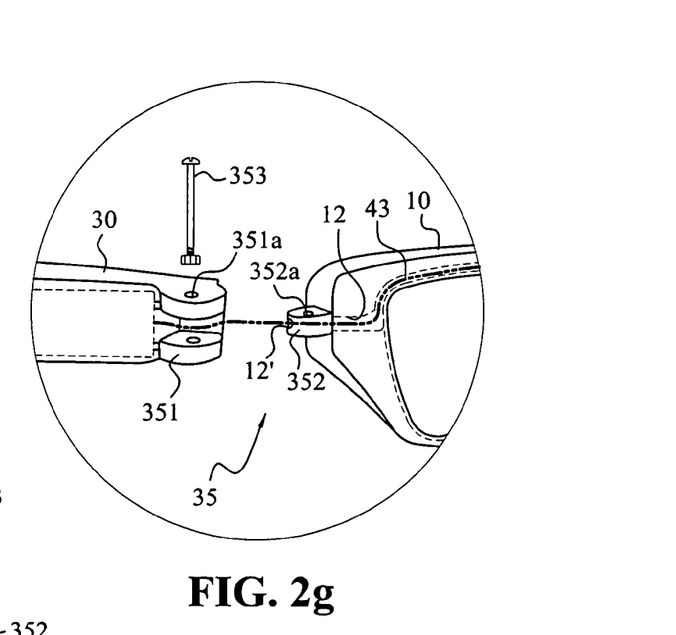
Figure 2H:
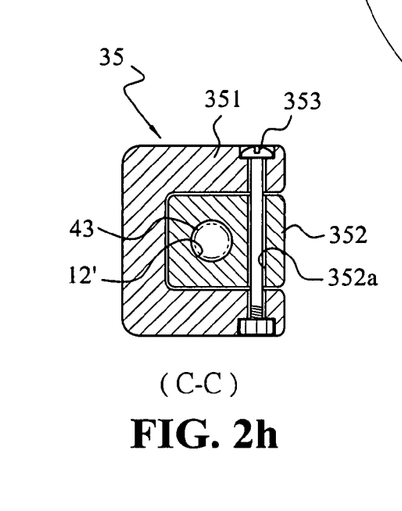
FIG. 2h is a schematic cross-sectional view taken along the C-C direction of FIG. 2c.

In turn, a detailed description will be made based on the hinge 35 of the left hand side as shown in FIG. 2g. The person skilled in the art should understand that the hinges at both sides are in left-right symmetry, and that the size and function of the hinges at both sides are identical. As shown in FIGS. 2g and 2h, the hinge 35 includes a pair of semi-circular seat sections 351 formed on one end of the temple 30 and a semi-circular protrusion section 352 formed at one side face of the eyewire 10. A through hole 352a is formed in the protrusion section 352, and a corresponding through hole 351a is formed on the pair of seat sections 351 respectively. Thus, the protrusion section 352 and the seat sections 351 is hinged together by penetrating a stud pin 353 through those through holes 351a, 252a. The stud pin 353 can be held in place by a suitable means such as a nut engaged with the threaded portion provided on the stud pin 353. The wire groove 12 has a circular passage 12' extending in a direction perpendicular to the through hole 352a and penetrating through the protrusion section 352 in a non-intersecting manner with the through hole 352a. In this way, the frame 1 for spectacle can be made slim and light-weighted.

Figure 3A:
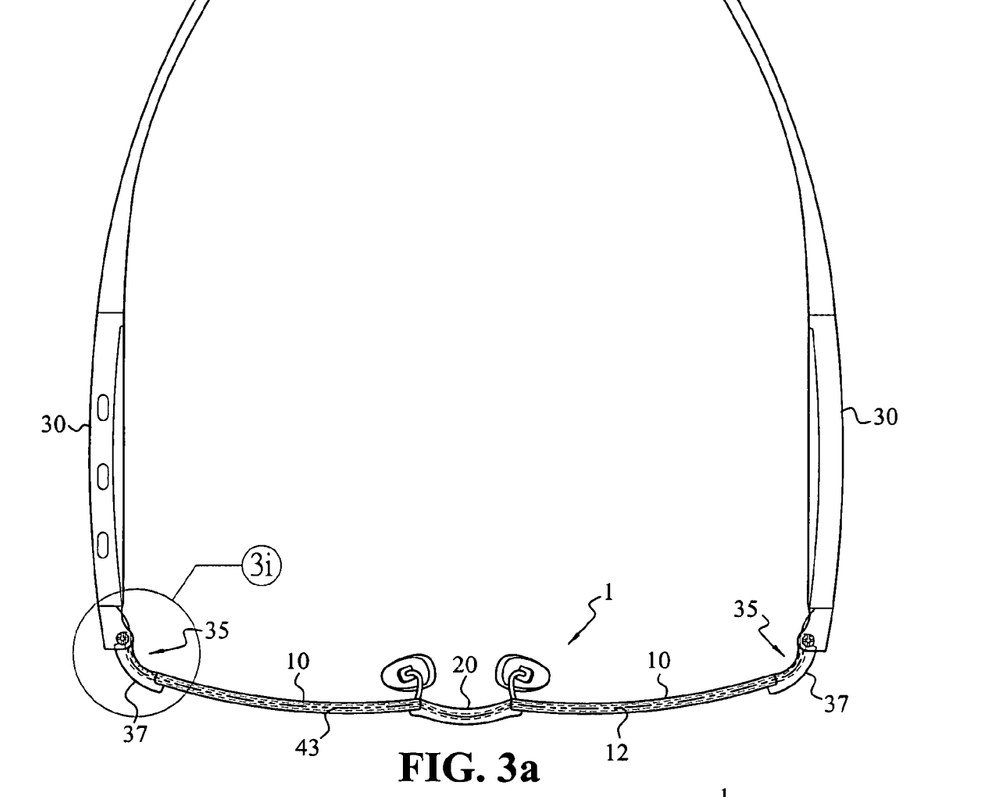
FIG. 3a is a schematic plane view showing the second embodiment of the frame of spectacle of the present invention.
Figure 3B:
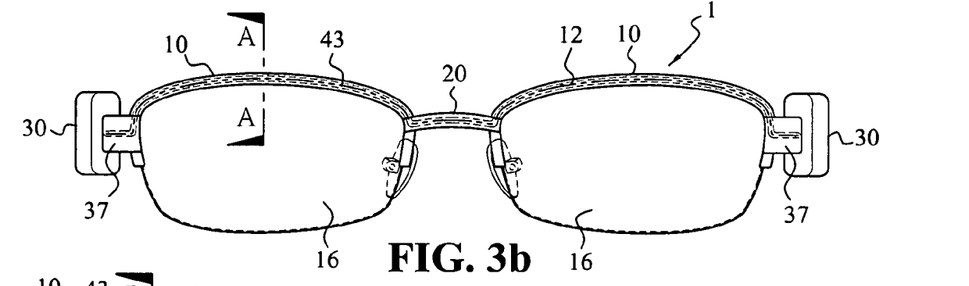
FIG. 3b is a schematic front view showing the second embodiment of the frame of spectacle of the present invention.
Figure 3C:
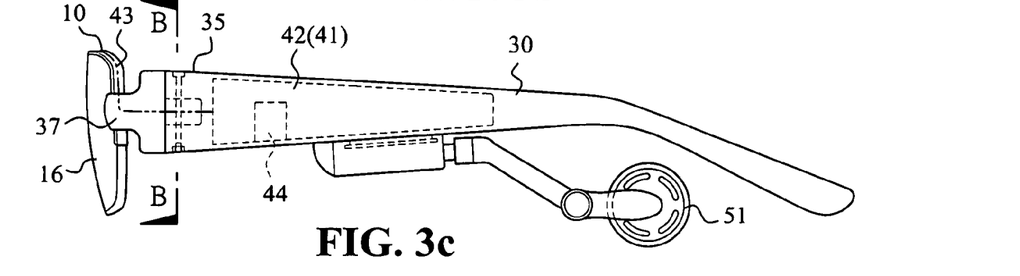
FIG. 3c is a schematic side view showing the second embodiment of the frame of spectacle of the present invention.
Figure 3D:
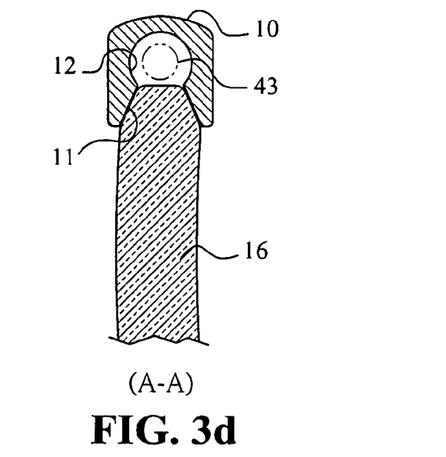
FIG. 3d is a schematic cross-sectional view taken along the A-A direction of FIG. 3b.

FIGS. 3a~3j show the second embodiment of the slim frame 1 of the spectacle having electronic device thereon of the present invention. The frame 1 of the spectacle of this embodiment is made of suitable metal material for glasses frame such as cupronickel, stainless steel, aluminum-magnesium alloy and titanium. As shown in FIGS. 3a, 3b and 3c, the frame 1 mainly comprises: a pair of eyewires 10 formed with an engaging section 11 along the inside portion of each eyewire 10 for engaging with a lens 16, and a bridge section 20 saddled between the pair of eyewires 10; a pair of temples 30 pivotally mounted respectively at both sides of the eyewires by hinges 35; a circuit board 41 provided on one of the temples 30, which has an media receiving and playing circuit for receiving and/or playing audio signals such as radio broadcasting signals or MP3; a power supply device 42, such as a rechargeable battery provided on the other temple 30 for supplying power to the circuit board 41 through a lead wire 43; and a pair of earphones 51 combined on the pair of temples 30 for converting electronic signals outputted from the electronic circuit into sound, in which a wire groove 12 for receiving the lead wire 43, as shown in FIG. 3d, is integrally formed on the upper end portion of the pair of eyewires 10 along the upper part of the engaging sections 11 of the glasses.

The lead wire 43 closely routing along the top side of the glasses 16 to effectively utilize the whole cross sectional area of the eyewires 10 and minimize the total size of the frame. The wire groove 12 penetrates through the bridge section 20 and the hinges 35. Given this structure, the lead wire 43 is able to electrically connect the circuit board 41 and the power supply device 42.

Figure 3E:
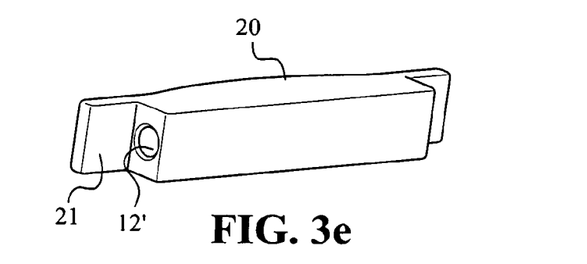
FIGS. 3e and 3f are schematic enlarged views showing two varying structures of the bridge section, in a detached state, of the second embodiment of the frame of spectacle of the present invention.
Figure 3F:
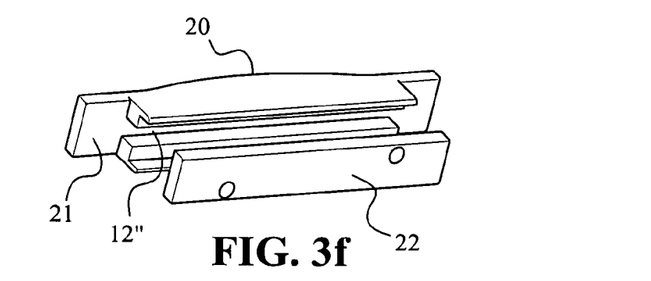

The bridge section 20 in this embodiment is a separate piece linked between the two eyewires 10 by welding. As shown in FIG. 3e, the bridge section 20 is of a hidden type design, in which the welded portions 21 projected from both ends of the bridge section 20 are provided for being welded with the eyewires 10. A circular passage 12' is formed by penetrating through the bridge section 20 to connect with the wire grooves 12 at both eyewires 10. Moreover, the bridge section 20 as shown in FIG. 3f can be a semi-hidden type design, in which a the welded portions 21 projected from both ends of the bridge section 20 are provided for being welded with the eyewires 10. An rectangular groove 12" is provided to traverse the back face of the bridge section 20 so as to connect with the wire grooves 12 on both eyewires 10, and a cover plate 22 having corresponding shape with the opened groove 12" is fixed over the opened groove 12" by suitable fastening means such as bolts.

As shown in FIGS. 3g~3j, the frame 1 of present embodiment further comprises a connection leg 36 interlinked between each eyewire 10 and the temple 30. For the sake of convenience, the following description will be made based on connection leg 36 of the right hand side as shown in FIGS. 3g~3j. The person skilled in the art should understand that the connection leg at both sides is in left-right symmetry and both the size and function of the connection legs at both sides are identical. The connection leg 36 has a vertical portion 361 and a curved horizontal portion 362 connected with the vertical portion 361 at the left side face. A semi-circular protrusion section 364 protrudes from the right side face of the vertical portion 361. A welding portion 363 projecting from the end of the horizontal portion 362 is provided for the welding with the eyewire 10.

Figure 3G:
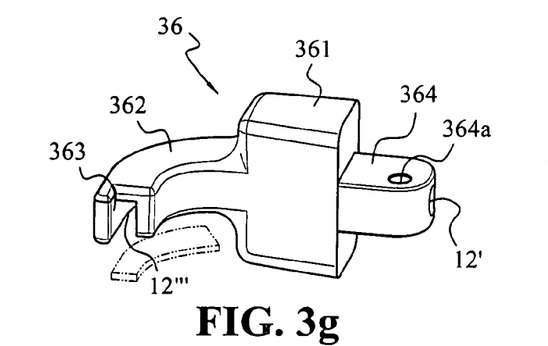
FIGS. 3g and 3h are enlarged schematic views showing two varying structures of the eyewire connection section, in a detached state, of the second embodiment of the frame of spectacle of the present invention.

The hinge 35 includes a pair of semi-circular seat sections 351 formed on one end of the temple 30 and the semi-circular protrusion section 364 protrudes from the side face of the vertical portion 361 of the connection leg 36. A through hole 364a is formed on the protrusion section 364, and correspondingly a through hole 351a is formed on the pair of seat sections 351. Thus, the protrusion section 352 and the seat sections 351 is enabled to pivot on a stud pin 353 penetrating through those through holes 351a, 364a. The stud pin 353 can be held in place by suitable means such as a nut engaged with the threaded portion provided on the stud pin 353. As shown in FIG. 3g, a groove 12''' in rectangular section opened on the bottom extends along the curved horizontal portion 362 and connects with a passage 12' of circular section extending in a direction perpendicular to the through hole 364a, and penetrating through the vertical portion 361 and the protrusion section 364 in a location deflected from the through hole 364a. Thus, a lead wire passing through the wire groove 12 can communicate with the associated components in both temples 30 through the passage within the connection leg 36 and the hinge 35. The opening on the bottom can be closed by a cap by tradition method such adhesion or supersonic welding, after the completion of wiring. Herein, the optimum arrangement of the stud pin 353, the wire groove 12 and the wall thickness can provide excellent downsizing for the frame.

Figure 3H:
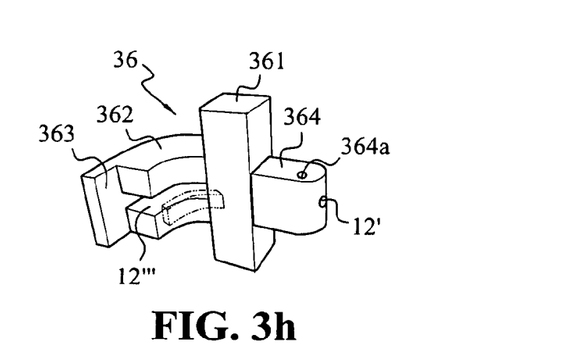
Figure 3I:
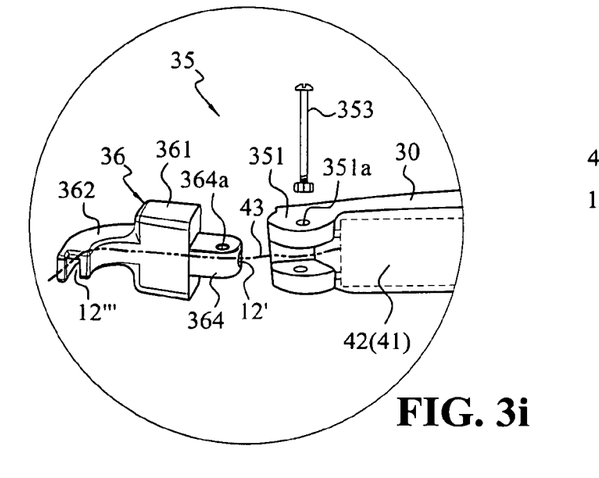
Figure 3J:
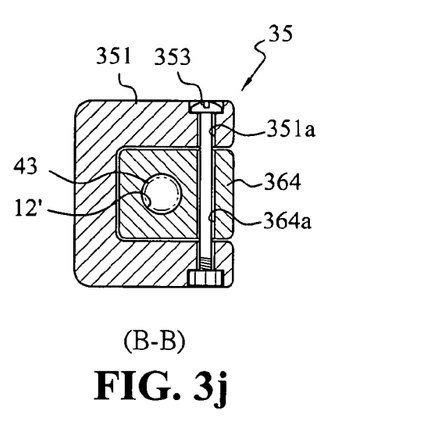
FIG. 3j is a schematic cross-sectional view taken along the B-B direction of FIG. 3c.

Alternatively, the groove 12''' in rectangular section can be opened on the inner side face, as shown in FIG. 3h, instead of on the bottom face of the curved horizontal portion 362. The opening on the side face can be closed by a cap by tradition method such adhesion or supersonic welding, after the completion of wiring. Except this point, the other is the same as above and therefore detailed description thereof is omitted.

Figure 4A:
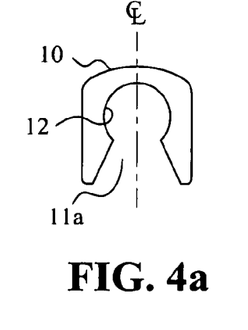
FIGS. 4a, 4b and 4c are schematic cross-sectional views showing three varying structures of the frame for spectacle of the present invention.
Figure 4B:
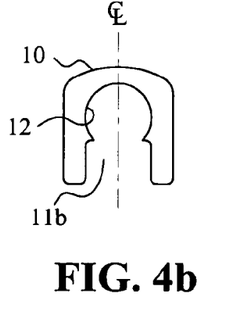
Figure 4C:
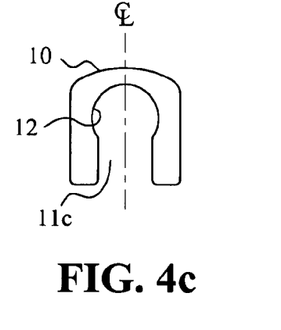

Several examples showing thinner designs for the frame 1 of spectacle based on the engagement method of the glass 16 with the eyewire 10 are illustrated in FIGS. 4a~4c. In FIG. 4a, the cross section of the wire groove 12 is circular and the engaging section (11) is formed as a downward diffusing opening 11a. The wire groove 12 and the opening 11a are centered on the centerline CL and connected together to form an opened groove facing downward. In FIG. 4b, except the opening 11b is equal in width and is formed with sharp stopping edges, the other is the same as above. In FIG. 4c, except the opening 11c is equal in width and no stopping edge as opening 11b is formed, the other is the same as above. However, the above are merely examples, not restrictive.

Figure 5A:
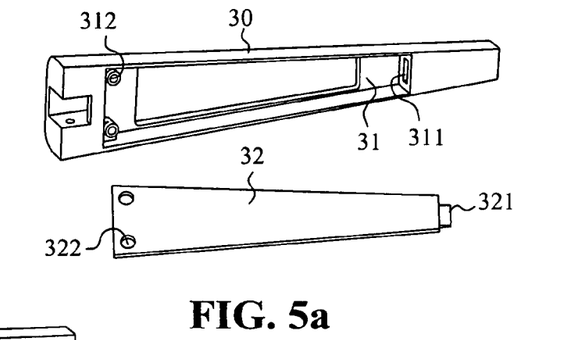
FIGS. 5a and 5b are schematic exploded views showing two similar structures of the temple of the frame of spectacle of the present invention.
Figure 5B:
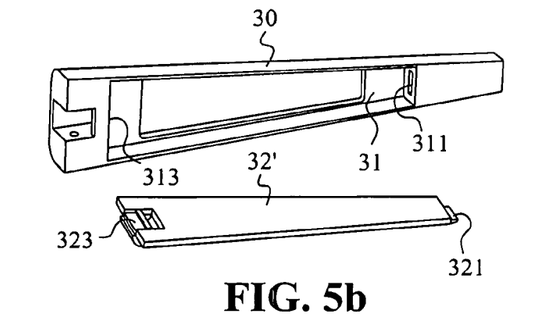

FIG. 5a shows the structure of the temple 30 according to a thinner design of the present invention. A receiving cavity 31 is formed at the inner side of each temple 30 for accommodating the circuit board 41 or the power supply device 42. A slot 311 is formed at one side and a pair of cylindrical bosses 312 are formed at the other side of the receiving cavity 31. A cover plate 32 used to closed the opening of the receiving cavity 31 has an tab 321 and two holes 322 at the other side corresponding to the pair of bosses 312. The cover plate 32 is fixed by suitable threaded means (not shown) into the cylindrical bosses 312 after the insertion of the tab 321 into the slot 311. Alternatively, the cover plate 32 is fixed in place by the interlocking of a movable grip 323 with a slot 312' provided on the receiving cavity 31 after the insertion of the tab 321 into the slot 311, as shown in FIG. 5b.

Figure 6:
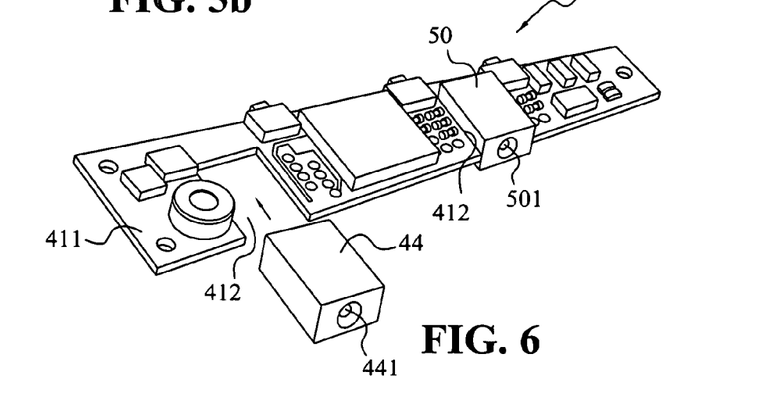
FIG. 6 is a schematic view showing a slim structure having an earphone socket and a charge socket mounted on the circuit board of this invention.
Figure 7:
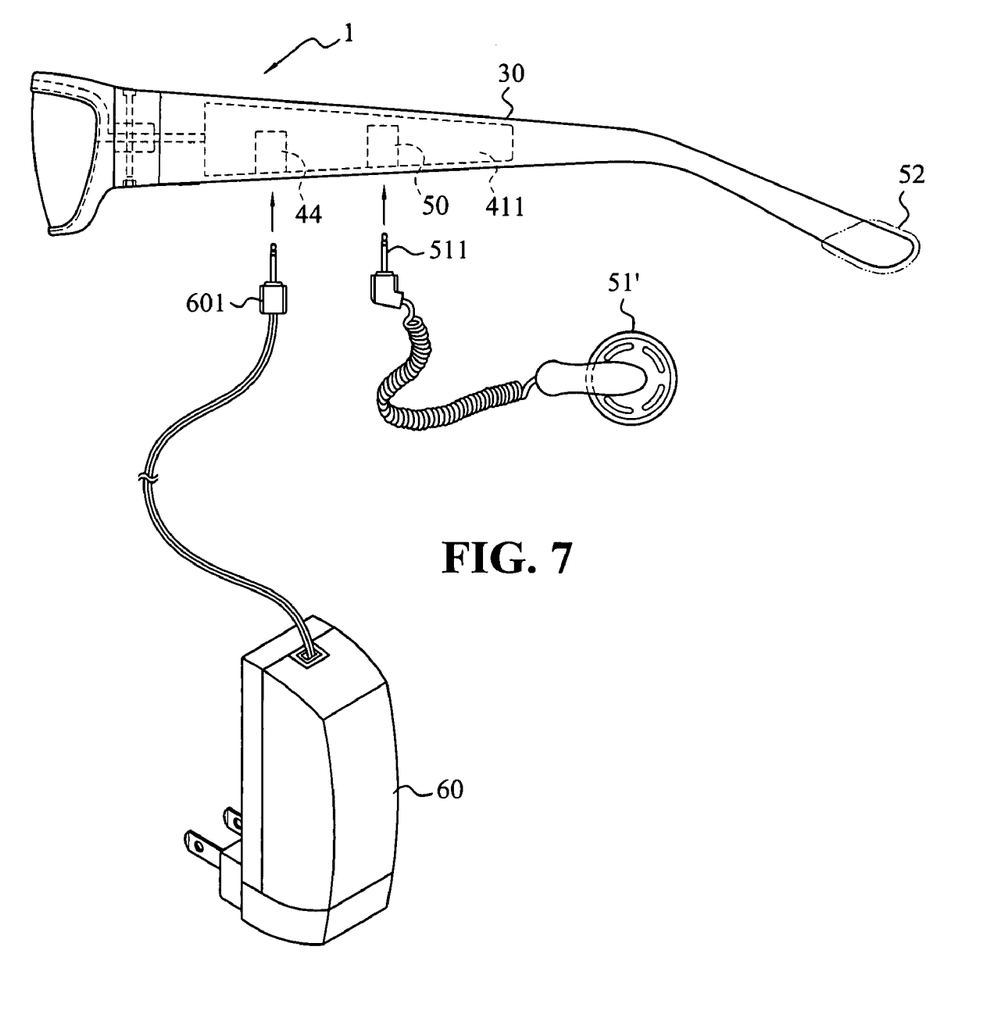
FIG. 7 is a schematic view showing the combination of a detachable earphone and an external charger to the temple of the present invention.

As shown in FIGS. 6 and 7, the circuit board contains a charge socket 44 and an earphone socket 50. The charge socket 44 has a plug hole 441 for the engagement with the plug 601 of a charger 60 when charging is conducted. On the other hand, the earphone socket 50 has a plug hole 501 for the insertion of a plug 511 from a detachable earphone 51' so that audio signals from the circuit board can be outputted from the earphone 51'. The thickness of the temples 30 is dependent on the thickness of the circuit board 41. In most cases, the components having largest thickness mounted on the circuit board 41 are charge socket and earphone socket. The circuit board 41 according to this invention is provided on its printed wiring board 411 with two cut-out portions 412 having the same outside dimensions as the charge socket 44 and the earphone socket 50, and the charge socket 44 and the earphone socket 50 are inserted respectively into the cut-out portions 412 such that the thickness of the charge socket 44 and the thickness of the earphone socket 50 are respectively evenly distributed on both sides of the circuit board 41. In this manner, both the thickness of the charge socket 44 and the thickness of the earphone socket 50 and thus the thickness of the circuit board 41 are totally accommodated within the range of the thickness of the temples without any additional enlargement on the temples. Accordingly, significant saving on the weight and the space can be obtained. Besides, the size required for earphone application can be reduced. Therefore, the effect of whole aesthetic coordination as well as the weight reduction can be achieved. Besides, the person skilled in the art can understand that a bone vibration microphone 52 can be provided on the terminal of the temples 30 such that the size and the weight of the temples 30 can be reduced.

The above embodiments are for illustrative purpose only, not for the restriction of the scope of the present invention. The equivalent modifications and variations made without departing from the spirit and principle of the present invention are considered still to be within the scope of the present invention.

What is claimed is:

1. A slim frame (1) of spectacle having electronic device thereon, comprising: a pair of eyewires (10) formed with an engaging section (11) along the inside of each eyewire (10) for engaging with a glass (16), and a bridge section (20) interlinked between said pair of eyewires (10); a pair of temples (30) pivotally mounted respectively at the outside of the eyewires (10) by a hinges (35); a circuit board (41) provided on one of the temples (30), which has an electronic circuit for receiving and/or playing audio signals; a power supply device (42) provided on the other temple (30) for supplying power to the circuit board (41) through a lead wire (43); and a pair of earphones (51) combined on the pair of temples 30 for converting the audio signals outputted from said electronic circuit into sound, wherein:

a wire groove (12) for receiving said lead wires (43) is integrally formed on the upper side of said pair of eyewires (10) along the upper part of the engaging sections (11) for glasses, said wire groove (12) penetrating through said bridge section (20) and said hinges (35) so that said lead wire (43) passing through said wire groove (12) electrically connects said circuit board (41) and said power supply device (42).

2. A slim frame (1) of spectacle having electronic device thereon according to claim 1, wherein the cross section of said wire groove (12) is circular and said engaging section (11) is formed as a downward diffusing opening (11a), and said wire groove (12) and said opening (11a) are centered on a centerline (CL) and connected together to form an opened groove facing downward.

3. A slim frame (1) of spectacle having electronic device thereon according to claim 1, wherein the cross section of said wire groove (12) is circular and said engaging section (11) is formed as an opening (11b) equal in width and formed with sharp stopping edges, and said wire groove (12) and said opening (11b) are centered on a centerline (CL) and connected together to form an opened groove facing downward.

4. A slim frame (1) of spectacle having electronic device thereon according to claim 1, wherein the cross section of said wire groove (12) is circular and said engaging section (11) is formed as an opening (11c) equal in width, and said wire groove (12) and said opening (11c) are centered on a centerline (CL) and connected together to form an opened groove facing downward.

5. A slim frame (1) of spectacle having electronic device thereon according to claim 1, wherein an elongated opened groove (12") in rectangular section is formed throughout the back face of said bridge section (20), and a cover plate (22) having shape conformity with the opened groove (12") overlays said opened groove (12").

6. A slim frame (1) of spectacle having electronic device thereon according to claim 5, wherein a pair of recessed portions (23') are provided near both ends of said opened groove (12"), a pair of lugs 23 in shape conformity with the recessed portion (23') being formed at both sides of said cover plate (22), two bolts (24) being used to fix said cover plate (22) on said bridge section (20).

7. A slim frame (1) of spectacle having electronic device thereon according to claim 6, further comprises a pair of nose pads (25) fixed together with said pair of lugs (23').

8. A slim frame (1) of spectacle having electronic device thereon according to claim 1, wherein a passage (12") in circular cross section penetrates throughout said bridge section (20).

9. A slim frame (1) of spectacle having electronic device thereon according to claim 1, wherein said hinge (35) includes a pair of semi-circular seat sections (351) formed on one end of the temple (30) and a semi-circular protrusion section (352) formed at the side face of the eyewire (10), a through hole (352a) being formed on said protrusion section (352), and correspondingly a through hole (351a) being formed on said pair of seat sections (351), said protrusion section (352) and said seat sections (351) pivoting on a stud pin (353) penetrating through said through holes (351a, 252a).

10. A slim frame (1) of spectacle having electronic device thereon according to claim 9, wherein a passage (12') in circular section extending in a direction perpendicular to said through hole (352a) is formed to penetrate through the protrusion section (352) in a location deflected from said through hole (352a).

11. A slim frame (1) of spectacle having electronic device thereon according to claim 1, wherein a connection leg (36) is linked between said eyewire (10) and said temple (30) at each side, each connection leg (36) having a vertical portion (361) and a curved horizontal portion (362) connected with the vertical portion (361) at a side face, a welding portion (363) projecting from the end of the curved horizontal portion (362) is provided for the welding with said eyewire (10).

12. A slim frame (1) of spectacle having electronic device thereon according to claim 11, wherein said hinge (35) includes a pair of semi-circular seat sections (351) formed on one end of said temple (30) and the semi-circular protrusion section (364) protruding from the side face of said vertical portion (361) of said connection leg (36), a through hole (364a) being formed on said protrusion section (364), and correspondingly a through hole (351a) being formed on said pair of seat sections (351), said protrusion section (364) and said seat sections (351) pivoting on a stud pin (353) penetrating through said through holes (351a, 364a).

13. A slim frame (1) of spectacle having electronic device thereon according to claim 12, wherein a groove (12''') in rectangular section opened on the bottom extends along said curved horizontal portion (362) and connects with a passage (12') in circular section extending in a direction perpendicular to said through hole (364a) and penetrating through said vertical portion (361) and said protrusion section (364) in a location deflected from said through hole (364a).

14. A slim frame (1) of spectacle having electronic device thereon according to claim 12, wherein a groove (12''') in rectangular section opened on the inner side face extends along said curved horizontal portion (362) and connects with a passage (12') in circular section extending in a direction perpendicular to said through hole (364a) and penetrating through said vertical portion (361) and said protrusion section (364) at a location deflected from said through hole (364a).

15. A slim frame (1) of spectacle having electronic device thereon according to claim 14, wherein said cover plate (32) is fixed above the receiving cavity (31) by the engagement of a movable grip (323) provided on said cover (323) into a slot (313) provided in said receiving cavity (31) after the insertion of a tab (321) on said cover (323) into a slot (311) provided in said receiving cavity (31).

16. A slim frame (1) of spectacle having electronic device thereon according to claim 1, wherein a receiving cavity (31) is formed at the inner side of each temple (30) for accommodating said circuit board (41) or said power supply device (42), and a cover plate (32) in shape conformity with said receiving cavity (31) overlays said receiving cavity (31).

17. A slim frame (1) of spectacle having electronic device thereon according to claim 16, wherein said cover plate (32)

is fixed above the receiving cavity (31) by suitable threaded means after the insertion of a tab (321) on said cover (323) into a slot (311) provided in said receiving cavity (31).

18. A slim frame (1) of spectacle having electronic device thereon according to claim 16, wherein a plurality of cut-out portions (412) are formed on the printed wiring board (411) of the circuit board (41) for accommodating a charge socket (44) and an earphone socket (50).

19. A slim frame (1) of spectacle having electronic device thereon according to claim 18, wherein said charge socket (44) and said earphone socket (50) are inserted into the cut-out portions (412) in such a manner that the thickness of said charge socket (44) and the thickness of said earphone socket (50) are evenly distributed on both sides of said circuit board (41).

20. A slim frame (1) of spectacle having electronic device thereon according to claim 19, wherein said charge socket (44) has a plug hole (441) for engaging with a plug (601) of a charger (60) when charging is conducted, on the other hand, said earphone socket (50) has a plug hole (501) for the insertion of a plug (511) from a detachable earphone (51').

21. A slim frame (1) of spectacle having electronic device thereon according to claim 16, wherein a bone vibration microphone (52) is mounted on the terminal of said temples (30).

22. A spectacle, wherein it comprises a slim frame (1) as claimed in claim 1.

\* \* \* \* \*